United States Patent
Tanaka

(10) Patent No.: US 10,764,025 B2
(45) Date of Patent: Sep. 1, 2020

(54) COMMUNICATION APPARATUS, COMMUNICATION METHOD, AND COMPUTER PROGRAM PRODUCT

(71) Applicant: Kabushiki Kaisha Toshiba, Minato-ku (JP)

(72) Inventor: Yasuyuki Tanaka, Chigasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/116,030

(22) Filed: Aug. 29, 2018

(65) Prior Publication Data

US 2019/0268131 A1 Aug. 29, 2019

(30) Foreign Application Priority Data

Feb. 28, 2018 (JP) ................................ 2018-035724

(51) Int. Cl.
*H04L 5/26* (2006.01)

(52) U.S. Cl.
CPC ..................... *H04L 5/26* (2013.01)

(58) Field of Classification Search
CPC ........................................................ H04L 5/26
See application file for complete search history.

(56) References Cited

U.S. PATENT DOCUMENTS

2016/0020864 A1 1/2016 Thubert et al.
2019/0007253 A1* 1/2019 Cavalcanti ............ H04W 48/10
2019/0082028 A1 3/2019 Tanaka

FOREIGN PATENT DOCUMENTS

JP 2019-50524 A 3/2019
WO WO 2017/026488 A1 2/2017
WO WO 2017/051723 A1 3/2017

OTHER PUBLICATIONS

"IEEE Standard for Low-Rate Wireless Networks," IEEE Standards Association, IEEE Computer Society, IEEE Std 802.15.4, 2015, pp. 95.
Q.Wang, et al., "6top Protocol (6P) draft-ietf-6tisch-6top-protocol-09," Internet Draft, 2017, pp. 45.

* cited by examiner

Primary Examiner — Melvin C Marcelo
(74) Attorney, Agent, or Firm — Oblon, McClelland, Maier & Neustadt, L.L.P.

(57) ABSTRACT

According to one embodiment, a communication apparatus includes one or more processors. The one or more processors select any schedule from among a plurality of schedules having processing units of data different from each other that are to be used for communication using a time-division multiplex method, based on an attribute of data. The one or more processors control transmission and reception of data according to the selected schedule.

12 Claims, 8 Drawing Sheets

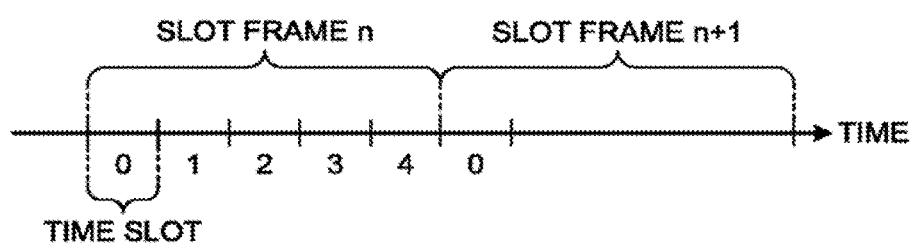

FIG.6

| | 0 | 1 | 2 | 3 | 4 | 5 |
|---|---|---|---|---|---|---|
| SLOT FRAME 1 | COMMON USE | | 100a→100b | | | |

| | 0 | 1 | 2 |
|---|---|---|---|
| SLOT FRAME 2 | | 100a→100b | |

FIG.7

| | 0 | 1 | 2 | 3 | 4 | 5 |
|---|---|---|---|---|---|---|
| SLOT FRAME 1 | COMMON USE | | 100a→100b | | | |

| | 0 | 1 | 2 |
|---|---|---|---|
| SLOT FRAME 2 | | 100a→100b | |

FIG.8

| 0 | 1 | 2 | 3 | 4 | 5 |
|---|---|---|---|---|---|
| COMMON USE | | 100a→100b | 100a→100b | | |

FIG.13

| SLOT FRAME 1 | 0 | 1 | 2 | 3 | 4 | 5 | 6 | 7 |
|---|---|---|---|---|---|---|---|---|
| | COMMON USE | | | | 100a→100b | | | |

| SLOT FRAME 2 | 0 | 1 | 2 | 3 |
|---|---|---|---|---|
| | COMMON USE | | 100a→100b | |

| SLOT FRAME 3 | 0 | 1 |
|---|---|---|
| | COMMON USE | 100a→100b |

COMMUNICATION APPARATUS, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2018-035724, filed on Feb. 28, 2018; the entire contents of which are incorporated herein by reference.

FIELD

Embodiments described herein relate generally to a communication apparatus, a communication method, and a computer program product.

BACKGROUND

The IEEE 802.15.4-2015 defines a transmission and reception method of Time-Slotted Channel Hopping (TSCH). In the TSCH, communication with high reliability can be performed by matching communication timings in advance between communication nodes. By using a 6top Protocol being formulated by IETF 6TiSCH WG, communication timings of TSCH can be dynamically matched between neighbor nodes.

Nevertheless, in the conventional technology, a communication efficiency declines in some cases. For example, in the TSCH, a time slot being a time division unit in a time-division multiplex method is set. The length of the time slot (slot length) affects a communication efficiency. In a case where a data length of data to be transmitted or received is small, if a slot length is small, a communication efficiency can be enhanced. On the other hand, if a slot length is large with respect to a data length of data to be transmitted or received, a communication efficiency can possibly decline.

BRIEF DESCRIPTION OF THE DRAWINGS

FIG. 3 is a diagram illustrating an example of a time division unit in a time-division multiplex method;

FIG. 4 is a diagram illustrating an example of a schedule in an initial state;

FIG. 5 is a diagram illustrating an example of a schedule;

FIG. 6 is a diagram illustrating an example of a schedule;

FIG. 7 is a diagram illustrating an example of a schedule to which a method of the present embodiment cannot be applied;

FIG. 8 is a diagram illustrating an example of a schedule to which a method of the present embodiment cannot be applied;

FIG. 13 is a diagram illustrating an example of using three slot frames;

DETAILED DESCRIPTION

Figure 1:
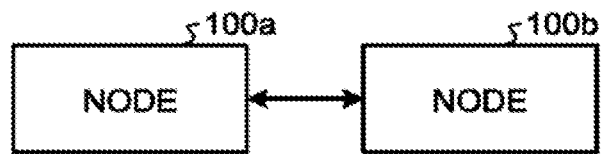
FIG. 1 is a block diagram of a communication system according to the present embodiment.

According to one embodiment, a communication apparatus includes one or more processors. The one or more processors select any schedule from among a plurality of schedules having processing units of data different from each other that are to be used for communication using a time-division multiplex method, based on an attribute of data. The one or more processors control transmission and reception of data according to the selected schedule.

A preferred embodiment of a communication apparatus according to the present invention will be described in detail below with reference to the appended drawings.

In the TSCH, a transmission node and a reception node of data perform transmission and reception processing at predetermined time and frequency. In the TSCH, for keeping a clock synchronized state between nodes, control data are transmitted and received at a predetermined frequency even in a case where the transmission node does not have data to be transmitted. In addition, a channel (frequency) to be used is changed each time data transmission and reception are performed. These types of communication control realize communication with high data reliability.

In the TSCH, a data length of data that can be transmitted and received at one time depends on a length of a time slot (link or cell) (slot length). The time slot is an example of a processing unit of data. For example, if a slot length is small, a data length of data that can be transmitted and received at one time becomes small, and if a slot length is long, a data length of data that can be transmitted and received at one time becomes large. Because data that is too large with respect to a slot length cannot be transmitted at one time, fragment processing and the like become necessary in a higher layer of the TSCH, and a communication efficiency declines. For example, in addition to communication overhead, processing overhead and mounting overhead (increase in memory requirement) are involved.

On the other hand, as described above, the length of the time slot affects a communication efficiency. Thus, in the communication of the time-division multiplex method such as the TSCH, it is desired to deal with data having various data lengths, without decreasing a communication efficiency.

A communication apparatus according to the present embodiment can avoid a decline in communication efficiency by the following functions, for example. First of all, the communication apparatus sets, as communication schedules of TSCH, a schedule with a small slot length, and a schedule with a large slot length. At this time, the schedules are set so as to start at the same time. For example, a slot length of a long time slot becomes multiples of a slot length of a short time slot. In addition, the same setting is applied to transmission start timings and reception timings of the both time slots.

A transmission node selects a time slot to be applied (short time slot or long time slot), according to a data length to be transmitted, and controls the transmission in accordance with the setting of the time slot. A reception node holds reception assuming a short time slot, and after the reception of data is started, determines whether to switch a time slot to be applied during the reception of data, to a long time slot.

FIG. 1 is a block diagram illustrating an example of a configuration of a communication system according to the present embodiment. As illustrated in FIG. 1, the communication system includes nodes 100a and 100b each serving as a communication apparatus. In addition, because the nodes 100a and 100b have similar configurations, they are simply referred to as nodes 100 in a case where there is no need to distinguish. The number of nodes 100 is not limited to two, and may be three or more. A plurality of nodes 100 are connected by a wireless network such as IEEE 802.15.4-2015, for example. The plurality of nodes 100 may be connected by any other connection forms, and may be connected by a wired network, for example.

Data are transmitted and received between the node 100a and the node 100b. For the sake of convenience, in the following description, the node 100a is treated as a transmission node of data, and the node 100b is treated as a reception node of data.

The node 100a and the node 100b are synchronized in time, and transmit and receive data at predetermined timings. Typically, the node 100a and the node 100b perform communication control using TSCH, but may use a time-division multiplex communication method other than the TSCH.

Figure 2:
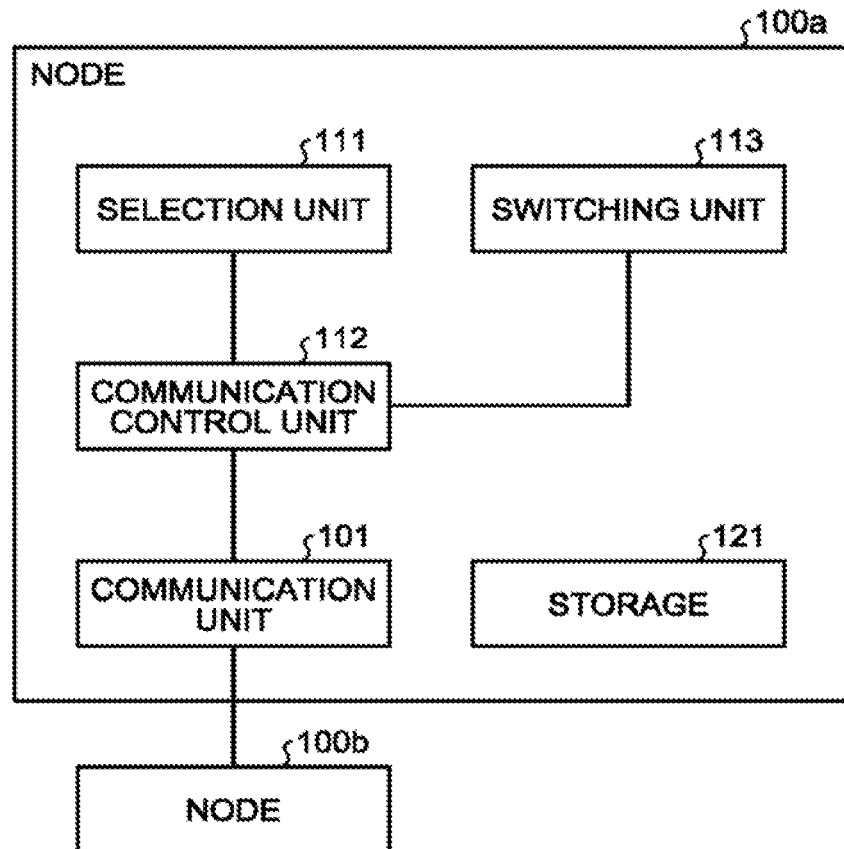
FIG. 2 is a block diagram of a node according to the present embodiment.

FIG. 2 is a block diagram illustrating an example of a configuration of the node 100 according to the present embodiment. As illustrated in FIG. 2, the node 100 includes a communication unit 101, a selection unit 111, a communication control unit 112, a switching unit 113, and storage 121.

The communication unit 101 is an interface for performing communication with an external device such as another node 100 (the node 100b in FIG. 2). Under the control of the communication control unit 112, the communication unit 101 performs communication using a time-division multiplex method such as TSCH.

The selection unit 111 selects one schedule to be applied, from among a plurality of schedules to be used for communication using the time-division multiplex method. For example, the selection unit 111 selects any schedule from among a plurality of schedules having time slot lengths different from each other, based on an attribute of data. The attribute of data is a data length of data to be transmitted or received, for example. Nevertheless, the attribute is not limited to this. For example, in cases such as a case where a data length can be distinguished according to the type of data, the type of data can be used as an attribute of data. For example, in such a situation that a data length of control data is short, and a data length of application data is long, the type of data indicating whether the data is control data or application data can be used as an attribute of data. In addition, for example, priority of data may be used as an attribute of data.

In addition, the node 100 may include only a function as a transmission node, or may include only a function as a reception node. In other words, the node 100 functions as at least either one of a transmission node and a reception node. In the case of functioning as a transmission node, the node 100 is only required to include at least functions related to the transmission of data. In the case of functioning as a reception node, the node 100 is only required to include at least functions related to the reception of data.

In the reception node, in some cases, an attribute of data cannot be determined until the data is received. In such a case, the selection unit 111 of the reception node may select a predefined schedule (first schedule), for example. As the predefined schedule, for example, a schedule having the smallest slot length can be used. After that, the switching unit 113 to be described later switches the schedule to another schedule as necessary with reference to an attribute of the received data.

The communication control unit 112 controls communication processing that uses time-division multiplex. For example, the communication control unit 112 controls communication that uses the communication unit 101 and the like, so as to transmit and receive a message according to the schedule selected by the selection unit 111. In the case of a communication method involving frequency hopping, such as TSCH, the communication control unit 112 also controls a radio channel to be used in communication in addition to a communication timing, to perform communication using the communication unit 101 and the like.

The switching unit 113 further switches the selected schedule to another schedule based on an attribute of data. For example, based on the attribute of data, the switching unit 113 switches the schedule (first schedule) selected by the selection unit 111, to another schedule (second schedule). The attribute of data such as a data length can be identified from header information of data to be transmitted or received data, for example.

Each of the above-described units (the selection unit 111, the communication control unit 112, and the switching unit 113) is implemented by one or a plurality of processors, for example. For example, each of the above-described units may be implemented by causing a processor such as a central processing unit (CPU) to execute a program, that is to say, may be implemented by software. Each of the above-described units may be implemented by a processor such as a dedicated integrated circuit (IC), that is to say, may be implemented by hardware. Each of the above-described units may be implemented by using both software and hardware. In the case of using a plurality of processors, each processor may implement one of the units, or may implement two or more of the units.

Next, communication using the time-division multiplex method will be described. FIG. 3 is a diagram illustrating an example of a time division unit in the time-division multiplex method. As illustrated in FIG. 3, in the time-division multiplex method, a time is divided into certain periods. The minimum unit of divided periods is referred to as a time slot, and one or more time slots are collectively referred to as a slot frame. In the example in FIG. 3, five time slots are included in one slot frame.

Each time slot is managed so as to be uniquely identified in a slot frame. Each time slot periodically appears in accordance with the lapse of time. In FIG. 3, time slots are identified by indices 0 to 4. For each slot frame, a time slot having the same index appears. In addition, each slot frame is managed so as to be uniquely identified in a sufficiently-long period. In the example in FIG. 3, an index "n" or "n+1" is granted to a slot frame. In addition, each time slot may be managed by granting an absolute identifier. In this case, each time slot can be similarly considered as a slot frame having an infinitely-long period having an infinite number of time slots.

For the node 100a and the node 100b communicating, which node 100 transmits data and which node 100 receives data in which time slot, or that both of the nodes 100 can transmit and receive data ("common use" to be described later) need to be defined. Deciding, for a time slot, processing to be performed in the time slot is referred to as scheduling, and a result of the scheduling is referred to as a schedule. FIG. 4 is a diagram illustrating an example of a schedule in an initial state. In addition, in the example in FIG. 4, six time slots are included in one slot frame.

In the schedule in FIG. 4, a leading time slot (time slot 0) of each slot frame is defined as "common use". In the time slot of "common use", the node 100a may transmit data, and the node 100b may transmit data. In other words, when having data desired to be transmitted to a counterparty, the node 100a and the node 100b can transmit the data using a leading time slot of each slot frame. In the case of not having data desired to be transmitted, each of the nodes 100 waits for reception of data in a leading time slot of each slot frame, and prepares for a case where data is transmitted.

Here, newly performing scheduling and granting an opportunity of data transmission to the node 100a will be considered. FIG. 5 is a diagram illustrating an example of a schedule set in this case.

In a case where scheduling is not manually performed for the node 100a and the node 100b, a schedule is adjusted between the plurality of nodes 100 using a control protocol such as a 6top Protocol (6P). In addition, for example, the node 100b and the node 100a can share the schedule in FIG. 5 by the node 100b requesting a reception time slot dedicated for the node 100b, from the node 100a.

In the case of performing frequency hopping (frequency switching) between the node 100a and the node 100b, not only timings of transmission and reception between the nodes, but also a channel or channel offset to be used are set. In the following description, for ease of description, the setting of the channel offset and the channel will be omitted.

Here, a case in which the node 100a transmits data to the node 100b will be considered. The schedule in FIG. 5 is set in the node 100a. Thus, a length of data to be transmitted needs to be smaller than a data length that can be transmitted within a time of a time slot having an index of 2. According to defined values in Table 8-86 of IEEE 802.15.4-2015—IEEE Standard for Low-Rate Wireless Networks, the longest transmission time per time slot is 4256 microseconds in a case where a frequency band to be used is 2450 MHz, and is 103040 microseconds in a case where the frequency band is 915 MHz. The maximum data length that can be transmitted in one time slot becomes 133 octets (bytes) when a data rate is 250 kbps in a 2450 MHz-band.

In the present embodiment, in a case where data transmission exceeding 133 octets is required, schedules as illustrated in FIG. 6 are set in the node 100a and the node 100b. In FIG. 6, the schedule illustrated in FIG. 5 is represented as a slot frame 1, and an additional schedule is represented as a slot frame 2. As illustrated in FIG. 6, a slot length of each time slot in the slot frame 2 is twice as long as a slot length of each time slot in the slot frame 1. In this manner, a slot length of a time slot of each of a plurality of slot frames is set so as to be multiples of the smallest slot length. In addition, the slot frame 1 and the slot frame 2 correspond to a plurality of schedules having processing units of data different from each other.

The node 100a and the node 100b transmit and receive data having a data length that can be transmitted in one time slot of the slot frame 1, using the schedule of the slot frame 1. The node 100a and the node 100b transmit and receive data having a data length that cannot be transmitted in one time slot of the slot frame 1, and can be transmitted in a time slot of the slot frame 2, using the schedule of the slot frame 2.

In the present embodiment, for enabling longer data transmission using a plurality of slot frames, time slots starting at the same time are allocated to the respective slot frames of the plurality of nodes 100 having a possibility of transmitting and receiving long data. In the example in FIG. 6, the start times of two communication opportunities in which "100a→100b" is allocated to the slot frame 1 and the slot frame 2 are the same.

Here, an example of a schedule to which the method of the present embodiment cannot be applied will be described. FIGS. 7 and 8 are diagrams illustrating examples of schedules to which the method of the present embodiment cannot be applied.

In the schedule in FIG. 7, start times of communication opportunities indicated by "100a→100b" allocated to two slot frames do not match. Thus, for example, the schedule cannot be switched during transmission and reception of data.

The schedule as illustrated in FIG. 8 cannot deal with transmission of data longer than a slot length. In this schedule, a transmission opportunity from the node 100a to the node 100b is granted to a time slot with an index 2 and a time slot with an index 3. The schedule is similar in appearance to the schedule of a time slot with an index 1 in the slot frame 2 in FIG. 6. Nevertheless, in the example in FIG. 8, data transmission and reception need to be stopped at the boundary between the time slot with the index 2 and the time slot with the index 3. In addition, data respectively transmitted in the time slot with the index 2 and the time slot with the index 3 are treated as separate data, and a header for communication control also becomes necessary for each piece of data.

According to the present embodiment, for example, as illustrated in FIG. 6, even data that cannot be transmitted in one time slot in the slot frame 1 can be transmitted from the node 100a to the node 100b without interruption, by using the time slot with the index 1 in the slot frame 2.

Figure 9:
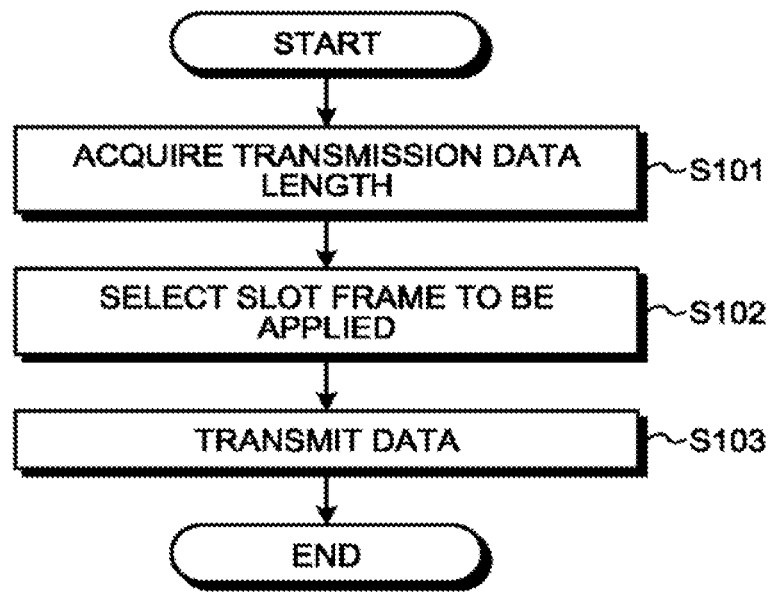
FIG. 9 is a flowchart of data transmission processing in the present embodiment.

Next, data transmission processing performed by the node 100 according to the present embodiment will be described. The data transmission processing is processing executed when a transmission node transmits data. FIG. 9 is a flowchart illustrating an example of data transmission processing in the present embodiment.

The selection unit 111 of the transmission node acquires a data length of data to be transmitted (transmission data length) (Step S101). Based on the transmission data length, the selection unit 111 selects a slot frame to be applied, from among a plurality of slot frames (schedules) (Step S102). The communication control unit 112 transmits data using the selected slot frame (Step S103).

In the case of selecting a slot frame to be applied, from the transmission data length, the selection unit 111 selects a slot frame in which data transmission can be completed at least in one time slot. For example, for data having a sufficiently-small data length, the selection unit 111 may select the slot frame 1 in FIG. 6, or may select the slot frame 2. On the other hand, for data having a large data length of which the transmission cannot be completed in one time slot in the slot frame 1, the selection unit 111 selects the slot frame 2. The selection unit 111 may select a slot frame having the smallest slot length, among slot frames in which data transmission can be completed in one time slot. For example, in the case of data having a sufficiently-small data length, the selection unit 111 may select not the slot frame 2 but the slot frame 1.

Figure 10:
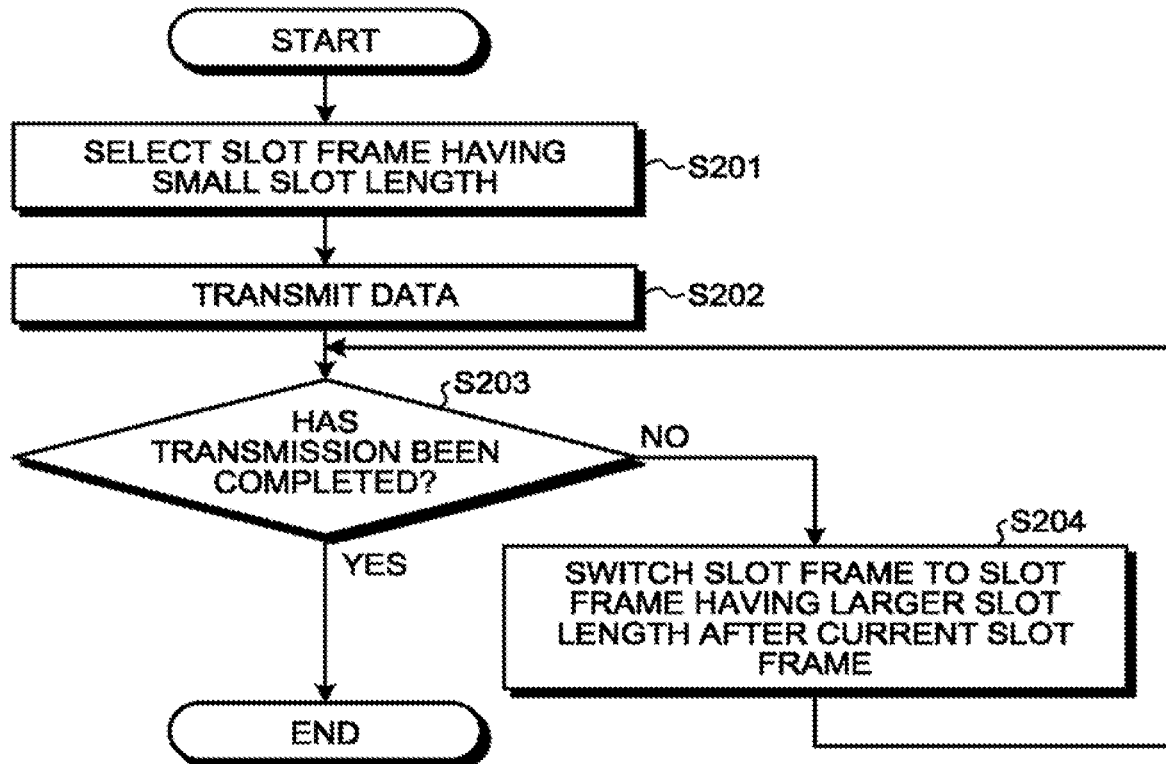
FIG. 10 is a flowchart of data transmission processing in the present embodiment.

FIG. 10 is a flowchart illustrating another example of data transmission processing in the present embodiment. FIG. 10 illustrates an example of initially selecting a predefined slot frame (first schedule), and during the data transmission by the selected slot frame, switching a slot frame to be applied, to another slot frame (second schedule), according to an attribute of data (data length, etc.).

The selection unit 111 selects a slot frame having a slot length smaller than other frames, from among a plurality of slot frames (Step S201). For example, the selection unit 111 selects a slot frame having the smallest slot length. In addition, in a case where there are three slot frames or more, the selection unit 111 may select a slot frame having a slot length that is neither the largest nor the smallest.

The communication control unit 112 transmits data using the selected slot frame (Step S202).

The switching unit 113 determines whether data transmission has been completed within a time slot (Step S203). In the standards of the time-division multiplex method such as TSCH, a start time of data transmission, a transmission completion time, a reception start time of acknowledgment (ACK) of transmission data, a reception completion time of the acknowledgment, and the like are defined for each time slot. According to such definitions, the switching unit 113 can determine whether data transmission has been completed by the transmission completion time, within the time of each time slot, for example.

In a case where the transmission has been completed (Step S203: Yes), the data transmission processing ends. In a case where the transmission has not been completed (Step S203: No), the switching unit 113 switches the slot frame to a slot frame having a slot length larger than the currently-selected slot frame (Step S204). For example, the switching unit 113 switches the slot frame to a slot frame having a larger slot length after the currently-selected slot frame. After that, the processing returns to Step S203, and the processing is repeated.

In this manner, a slot frame to be applied is appropriately switched during the data transmission, and a slot frame having a slot length in which data transmission can be completed is finally selected, and data transmission processing ends. In other words, the selection unit 111 selects a slot frame having a slot length smaller than other slot frames, and the switching unit 113 switches the slot frame to a slot frame having a large slot length, according to an attribute of data (data length, etc.).

In contrast, the selection unit 111 may select a slot frame having a slot length larger than other slot frames, and the switching unit 113 may switch the slot frame to a slot frame having a small slot length, according to an attribute of data (data length, etc.). For example, the switching unit 113 switches the slot frame to another slot frame in a case where it can be determined that processing by the selected slot frame ends within one time slot, and processing ends also within a time slot of another slot frame.

In the examples in FIGS. 9 and 10, the description of abnormal processing has been omitted for ease of description, but data transmission fails in a case where there is no slot frame that can deal with a data length to be transmitted. In addition, in a case where processing of switching a slot frame is not performed during data transmission (e.g. FIG. 10), the node 100 serving as a transmission node needs not include the switching unit 113.

Figure 11:
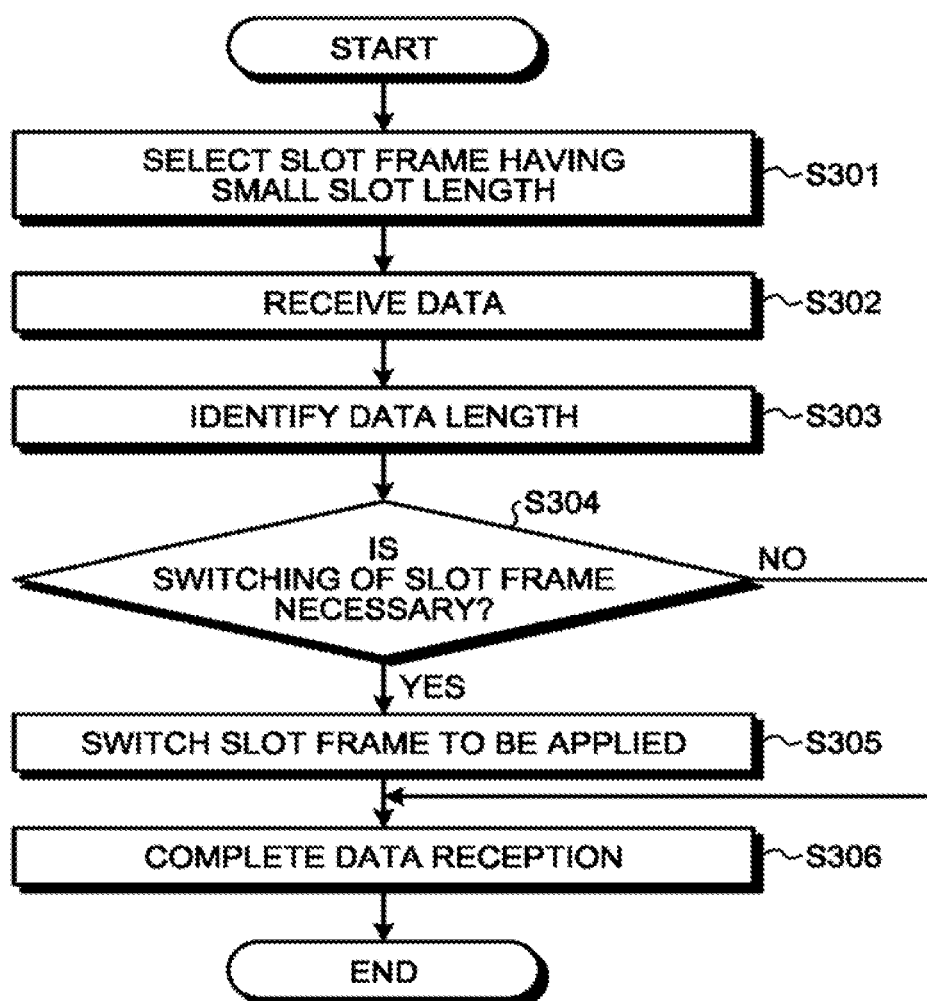
FIG. 11 is a flowchart of data reception processing in the present embodiment.

Similarly to the node 100a, the node 100b serving as a reception node selects a slot frame to be applied, according to a data length of data to be received. FIG. 11 is a flowchart illustrating an example of data reception processing in the present embodiment.

The selection unit 111 of a reception node selects a predefined slot frame from among a plurality of slot frames (Step S301). For example, the selection unit 111 selects a slot frame having a slot length smaller than other frames, or a slot frame having the smallest slot length.

The communication control unit 112 starts data reception using the selected slot frame (Step S302).

The switching unit 113 identifies a data length of the entire data to be received (reception data length), from header information of data or the like, for example (Step S303). The switching unit 113 determines whether switching of the slot frame is necessary, based on the reception data length (Step S304). For example, the switching unit 113 identifies whether the reception of data having the reception data length can be completed in one time slot of the currently-selected slot frame.

In a case where switching is determined to be necessary (Step S304: Yes), the switching unit 113 switches a slot frame to be applied, to a slot frame in which reception of data having the reception data length can be completed (Step S305). In a case where the reception cannot be completed in the current slot frame because the reception data length is large, for example, the switching unit 113 switches the slot frame to a slot frame in which the reception can be completed. In addition, in a case where the reception can be completed even in a slot frame having a slot length smaller than the current slot frame because the reception data length is small, for example, the switching unit 113 may switch the slot frame to a slot frame having a smaller slot length.

After the switching of the slot frame, or in a case where the switching is determined to be unnecessary (Step S304: No), the communication control unit 112 continues the processing until data reception is completed (Step S306).

Figure 12:
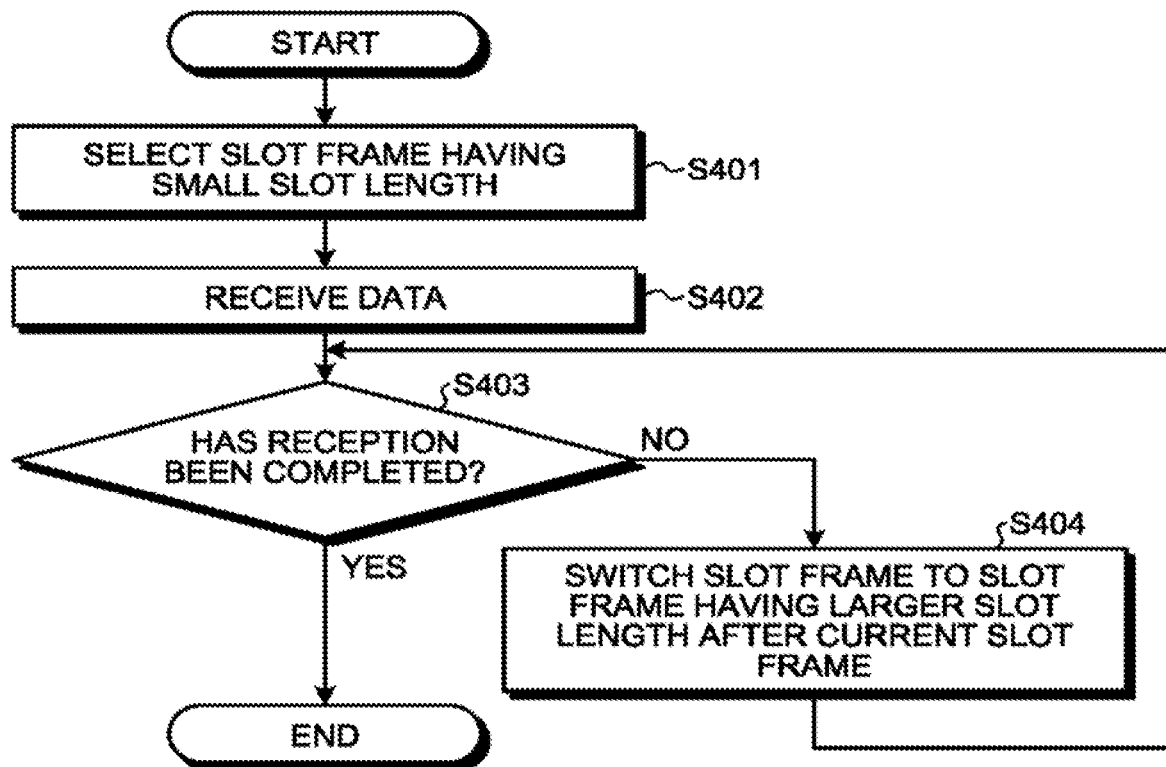
FIG. 12 is a flowchart of data reception processing in the present embodiment.

FIG. 12 is a flowchart illustrating another example of data reception processing in the present embodiment. FIG. 12 illustrates an example of initially selecting any slot frame, and switching a slot frame to be applied, according to whether data reception can be completed by the selected slot frame.

The selection unit 111 of a reception node selects a slot frame having a slot length smaller than other frames, from among a plurality of slot frames (Step S401). For example, the selection unit 111 selects a slot frame having the smallest slot length.

The communication control unit 112 starts data reception using the selected slot frame (Step S402). The switching unit 113 determines whether data reception has been completed within a time slot (Step S403).

In a case where the reception has been completed (Step S403: Yes), the data reception processing ends. In a case where the reception has not been completed (Step S403: No), the switching unit 113 switches the slot frame to a slot frame having a slot length larger than the currently-selected slot frame (Step S404). For example, the switching unit 113 switches the slot frame to a slot frame having a larger slot length after the currently-selected slot frame. After that, the processing returns to Step S403, and the processing is repeated.

Similarly to the data transmission processing (transmission node), a slot frame having a large slot length may be switched to a slot frame having a small slot length.

The transmission node may employ both types of data transmission processing in FIGS. 9 and 10. The reception node may employ both types of data reception processing in FIGS. 11 and 12. Thus, in the case of the above example, four-pattern configurations which is a combination of two-pattern transmission nodes (FIG. 9 or 10) and two-pattern reception nodes (FIG. 11 or 12) can be employed.

Modified Example 1

The example of selecting either of two slot frames has been mainly described so far. The number of slot frames may be three or more. FIG. 13 is a diagram illustrating an example of using three slot frames.

In the example in FIG. 13, start times of a time slot with an index 4 in a slot frame 1, a time slot with an index 2 in a slot frame 2, and a time slot with an index 1 in a slot frame 3 match. A slot length of the time slot with the index 2 in the slot frame 2 is twice as long as a slot length of the time slot with the index 4 in the slot frame 1. A slot length of the time slot with the index 1 in the slot frame 3 is twice as long as the slot length of the time slot with the index 2 in the slot frame 2. These three time slots can be switched with each other.

Operation Example

Figure 14:
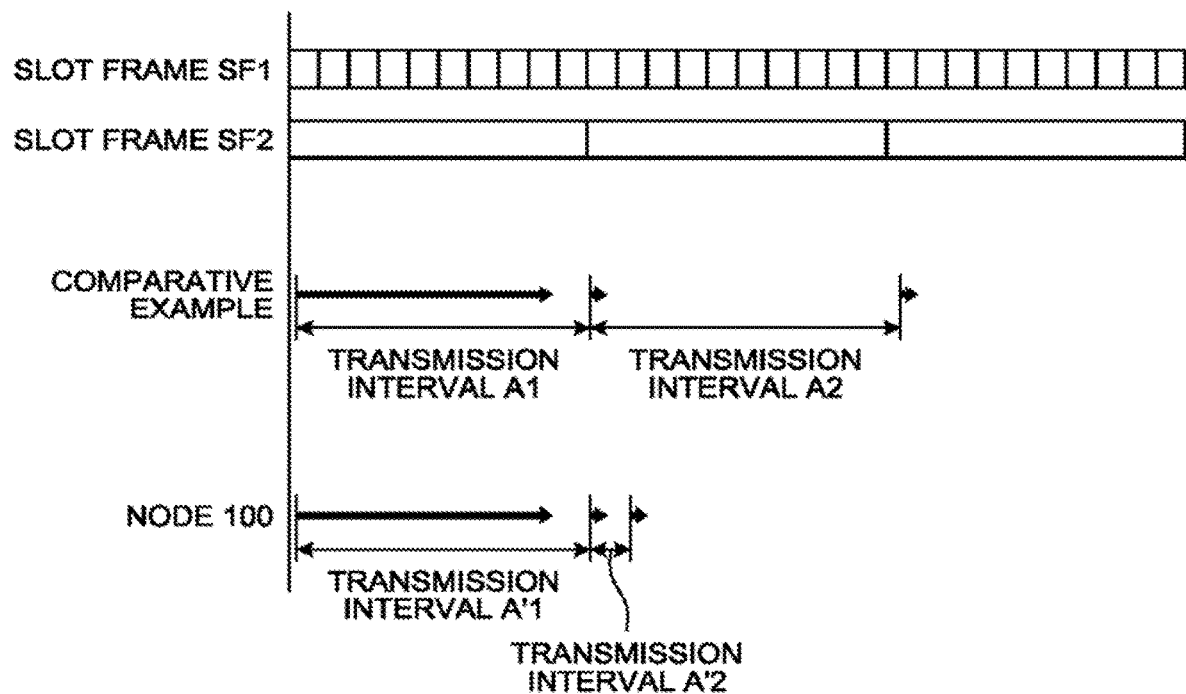
FIG. 14 is a diagram illustrating an operation example of data transmission processing according to the present embodiment.

Next, an example of an operation according to the present embodiment will be described while comparing with a communication apparatus not including the function of the present embodiment (comparative example). FIG. 14 is a diagram illustrating an operation example of data transmission processing according to the present embodiment.

At the beginning, two communication schedules are set in each of the node 100 of the present embodiment and the communication apparatus of the comparative example. For example, one is set as a slot frame SF1 including a time slot that can transmit and receive at one time data with 127 octets at longest, and another one is set as a slot frame SF2 including a time slot that can transmit and receive at one time data with 2047 octets. A length (time) of each time slot is adjusted so that a short time slot starts at a start timing of a long time slot.

After performing the setting in this manner, a procedure of transmitting data with 2047 octets from each apparatus (the node 100, the communication apparatus of the comparative example) is established. After that, each apparatus is caused to consecutively transmit data with 2047 octets, 127 octets, and 127 octets (e.g. transmit by unicast). The timing of each data transmission at this time is represented as in FIG. 14.

In the communication apparatus of the comparative example, a data transmission interval becomes constant irrespective of data length. In other words, a transmission interval A1 and a transmission interval A2 match. On the other hand, the node 100 of the present embodiment selects the slot frame SF1 in a case where a data length is a length (127 octets or less) that can be transmitted in the slot frame SF1, and selects the slot frame SF2 in a case where a data length is a length that cannot be transmitted in the slot frame SF1. In this manner, in the present embodiment, a data transmission interval varies depending on a data length. In other words, a transmission interval A'1 corresponding to a period in which data with 2047 octets has been transmitted does not match a transmission interval A'2 corresponding to a period in which data with 127 octets has been transmitted.

By studying data transmission timings in this manner, it can be determined whether the communication apparatus includes the function of the present embodiment.

Instead of determining a data transmission interval, the determination may be performed by counting the number of data transmitted in a period with a long time slot. In a case where the function of the present embodiment is not included, only one data is observed in the period with a long time slot, irrespective of a transmission data length. On the other hand, in a case where the function of the present embodiment is included, two data are observed in the period with a long time slot in a case where a transmission data length is small.

FIG. 14 illustrates an example of a determination method in data transmission processing, but the same applies to a determination method for data reception processing. Also in the case of data reception processing, similarly to FIG. 14, three data are consecutively received, and transmission timings of an acknowledgment (ACK) frame are acquired. A transmission interval of acknowledgments can be used for determination.

In this manner, in the communication apparatus according to the present embodiment, any schedule is selected from among a plurality of schedules having slot lengths different from each other, based on an attribute of data, and data transmission and reception are controlled according to the selected schedule. This can suppress a decline in communication efficiency.

Figure 15:
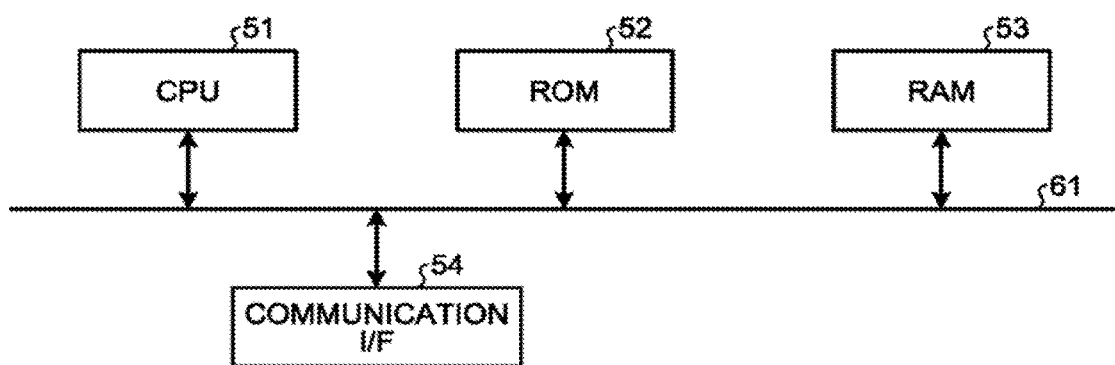
FIG. 15 is a hardware configuration diagram of a communication apparatus according to the present embodiment.

Next, a hardware configuration of the communication apparatus according to the present embodiment will be described using FIG. 15. FIG. 15 is an explanatory diagram illustrating a hardware configuration example of the communication apparatus according to the present embodiment.

The communication apparatus according to the present embodiment includes a control device such as a central processing unit (CPU) 51, a storage device such as a read only memory (ROM) 52 and a random access memory (RAM) 53, a communication I/F 54 that connects to a network and performs communication, and a bus 61 that connects the units.

Programs to be executed by the communication apparatus according to the present embodiment are provided with being preinstalled on the ROM 52 or the like.

Programs to be executed by the communication apparatus according to the present embodiment may be provided as a computer program product with being recorded on a computer-readable recording medium such as a compact disk read only memory (CD-ROM), a flexible disk (FD), a compact disk recordable (CD-R), and a digital versatile disk (DVD), in files having an installable format or an executable format.

Furthermore, programs to be executed by the communication apparatus according to the present embodiment may be stored on a computer connected to a network such as the Internet, and provided by being downloaded via the network. In addition, programs to be executed by the communication apparatus according to the present embodiment may be provided or delivered via a network such as the Internet.

Programs to be executed by the communication apparatus according to the present embodiment can cause a computer to function as each unit of the above-described communication apparatus. The computer can be executed by the CPU 51 loading a program from a computer-readable storage medium onto a main storage device, and executing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A communication apparatus comprising:
one or more processors configured to:

select any schedule from among a plurality of schedules having processing units of data different from each other that are to be used for communication using a time-division multiplex method;
switch the selected schedule to one of the plurality of schedules during process of transmission or reception based on an attribute of data subjected to the process; and
control transmission and reception of data according to the one of the plurality of schedules, wherein
the selected schedule has a first processing unit and the one of the plurality of schedules has a second processing unit,
a start time of the first processing unit and a start time of the second processing unit are same, and
a process allocated to the first processing unit and a process allocated to the second processing unit are same.

2. The communication apparatus according to claim 1, wherein the attribute is a data length of data to be transmitted or received.

3. The communication apparatus according to claim 1, wherein one of a length of the first processing unit or a length of the second processing unit is a multiple of the other one of the length of the first processing unit or the length of the second processing unit.

4. The communication apparatus according to claim 1, wherein
the one or more processors select any of the schedules from among the plurality of schedules based on an attribute of data to be transmitted, before transmission of data is started, and
the one or more processors control transmission of data according to the selected schedule.

5. The communication apparatus according to claim 1, wherein
the one or more processors select a predefined first schedule from among the plurality of schedules,
the one or more processors control reception of data according to the first schedule, and
the one or more processors further configured to switch the first schedule to a second schedule based on an attribute of the received data.

6. The communication apparatus according to claim 1, wherein
the one or more processors select a first schedule having the first processing unit smaller than the processing unit of data of another schedule, from among the plurality of schedules, and
the one or more processors further configured to switch to a second schedule having the second processing unit larger than the first processing unit, in a case where transmission or reception of data is not completed within the first processing unit.

7. The communication apparatus according to claim 1, wherein
the one or more processors select a first schedule having the first processing unit larger than the processing unit of data of another schedule, from among the plurality of schedules, and
the one or more processors further configured to switch to a second schedule having the second processing unit smaller than the first processing unit, in a case where transmission or reception of data has been completed within the first processing unit of the first schedule.

8. The communication apparatus according to claim 1, wherein
the plurality of schedules includes a first schedule having a small processing unit, and a second schedule having a large processing unit,
the attribute is a data length of data to be transmitted or received, and
the one or more processors select the first schedule in a case where the data length is a length in which transmission or reception can be performed in a processing unit of the first schedule, and selects the second schedule in a case where the data length is a length in which transmission or reception cannot be performed in a processing unit of the first schedule.

9. The communication apparatus according to claim 1, wherein the one or more processors switch a schedule applied to the first processing unit from the selected schedule to the one of the plurality of schedules during process of the first processing unit based on the attribute of data subjected to the process of the first processing unit.

10. A communication method comprising:
selecting any schedule from among a plurality of schedules having processing units of data different from each other that are to be used for communication using a time-division multiplex method;
switching the selected schedule to one of the plurality of schedules during process of transmission or reception based on an attribute of data subjected to the process; and
controlling transmission and reception of data according to the one of the plurality of schedules, wherein
the selected schedule has a first processing unit and the one of the plurality of schedules has a second processing unit,
a start time of the first processing unit and a start time of the second processing unit are same, and
a process allocated to the first processing unit and a process allocated to the second processing unit are same.

11. A computer program product having a non-transitory computer readable medium including programmed instructions, wherein the instructions, when executed by a computer, cause the computer to perform:
selecting any schedule from among a plurality of schedules having processing units of data different from each other that are to be used for communication using a time-division multiplex method;
switching the selected schedule to one of the plurality of schedules during process of transmission or reception based on an attribute of data subjected to the process; and
controlling transmission and reception of data according to the one of the plurality of schedules, wherein
the selected schedule has a first processing unit and the one of the plurality of schedules has a second processing unit,
a start time of the first processing unit and a start time of the second processing unit are same, and
a process allocated to the first processing unit and a process allocated to the second processing unit are same.

12. A communication apparatus comprising:
one or more processors configured to:
select any schedule from among a plurality of schedules having processing units of data different from each other that are to be used for communication using a time-division multiplex method, based on a data length of data; and control transmission and reception of the data according to the selected schedule, wherein
the plurality of schedule include a first schedule having a first processing unit and a second schedule having a second processing unit,
a start time of the first processing unit and a start time of the second processing unit are same, and
a process allocated to the first processing unit and a process allocated to the second processing unit are same.

* * * * *